United States Patent [19]

Petersen

[11] Patent Number: 5,133,137
[45] Date of Patent: Jul. 28, 1992

[54] METHOD AND APPARATUS FOR HEAT TREATING A PARTICULATE PRODUCT

[75] Inventor: Bjarne M. Petersen, Solrød, Denmark

[73] Assignee: Niro A/S, Soborg, Denmark

[21] Appl. No.: 650,878

[22] Filed: Feb. 5, 1991

[30] Foreign Application Priority Data

Feb. 8, 1990 [EP] European Pat. Off. ........ 90610011.0

[51] Int. Cl.⁵ ............................................. F26B 17/10
[52] U.S. Cl. ...................................... 34/57 A; 34/10; 432/58
[58] Field of Search ................. 34/57, 48, 10; 432/58, 432/15

[56] References Cited

U.S. PATENT DOCUMENTS

| 3,349,500 | 10/1967 | Wall . |
| 4,051,603 | 10/1977 | Kern, Jr. . |
| 4,492,040 | 1/1985 | Jensen et al. . |
| 4,627,173 | 12/1986 | O'Hagan et al. ........................ 34/10 |
| 4,628,833 | 12/1986 | O'Hagan et al. ................... 34/57 A |
| 5,034,196 | 7/1991 | Zenz et al. ........................... 110/245 |

FOREIGN PATENT DOCUMENTS

| 87039 | 8/1983 | European Pat. Off. . |
| 243736 | 11/1987 | European Pat. Off. . |
| 2912579 | 1/1980 | Fed. Rep. of Germany . |
| 2929056 | 1/1980 | Fed. Rep. of Germany . |
| 3400398 | 12/1984 | Fed. Rep. of Germany . |
| 2160046 | 6/1973 | France . |
| 2070751 | 9/1981 | United Kingdom . |
| 2113112 | 8/1983 | United Kingdom . |
| 2126916 | 4/1984 | United Kingdom . |

Primary Examiner—Henry C. Yuen
Attorney, Agent, or Firm—Dennison, Meserole, Pollack & Scheiner

[57] ABSTRACT

A method and apparatus for heat treating a particulate product including fluidizable as well as non-fluidizable particles. The particles are fed to a first perforated bed plate of a fluidized bed apparatus comprising at least one further stage formed by a second perforated bed plate. Heat treating gas is supplied upwardly to the first and second bed plates to fluidize the fluidizable particles thereon. The non-fluidizable particles are moved from the first bed plate into at least one discharge passage opening in the first bed plate. A flow of classifying gas is directed upwardly through the discharge passage to prevent fluidizable particles from leaving the fluidized bed through the discharge passage, while non-fluidizable particles are allowed to be discharged. The fluidizable particles are transferred from the first stage into the second stage for further treatment.

31 Claims, 2 Drawing Sheets

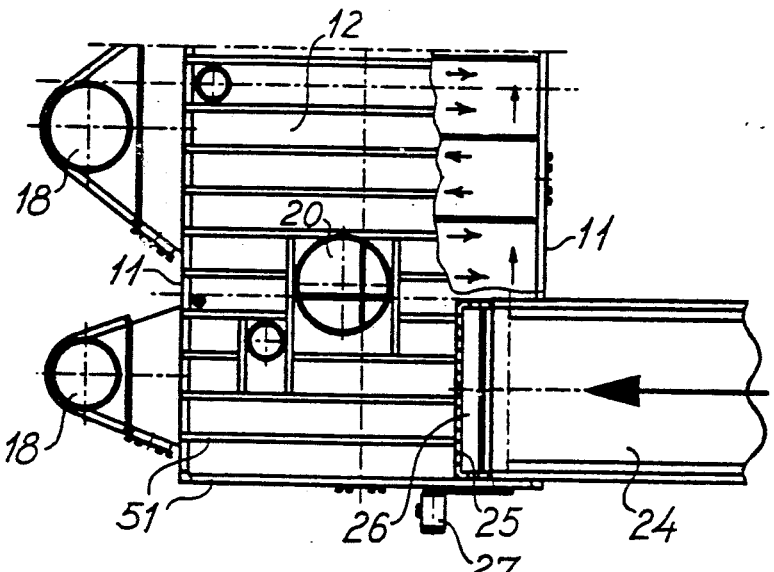
Fig. 3
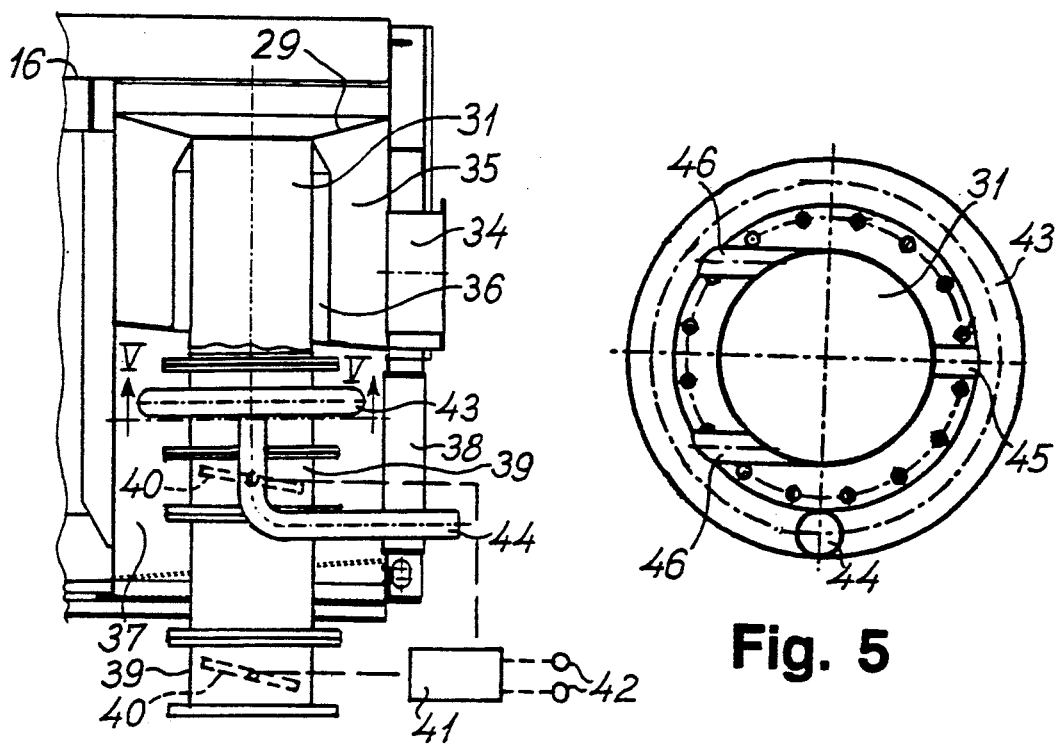
Fig. 4
Fig. 5

METHOD AND APPARATUS FOR HEAT TREATING A PARTICULATE PRODUCT

BACKGROUND OF THE INVENTION

1. Field of the Invention

The present invention relates to a method and apparatus for heat treating a particulate product, such as drying and/or cooling such product.

2. Description of Prior Art

It is well-known to dry a moist, particulate product in a fluid bed dryer. This moist product may, for example, have been prepared from a solution or slurry in a spray dryer. A single stage spray drying process may be replaced by a two-stage process, i.e. spray drying followed by fluid bed drying, in order to obtain a capacity increase and/or a better product quality. In this two-stage drying process it is often desirable to transfer the moist, particulate product prepared in the spray dryer to the fluid bed dryer with the highest possible residual moisture content. Furthermore, some products tend to form lumps during spray drying or other manufacturing processes. The presence of lumps may present problems for a subsequent fluid bed drying of such products. In some cases, it is possible to dry a particulate product which is not immediately fluidizable, if the product comprising small lumps can be fed to the top of a totally mixed, so-called back mixed fluidized layer, for example by means of a rotating product spreader. Such a technique is known from U.S. Pat. No. 3,771,237, which discloses a two-stage fluid bed. The first stage is a back mixed bed receiving the wet feed, and the second stage is a plug flow fluid bed for drying the product to its final residual moisture content.

However, if a product contains big lumps, it is not possible to achieve a uniform drying in a back mixed bed, and drying in a plug flow bed is also out of question.

U.S. Pat. No. 4,787,152 discloses a fluid bed dryer by means of which it is possible to treat products having a wide range of particle sizes. This known fluid bed dryer is provided with a product feeder or delumper comprising alternate rows of cooperating discs carried by two parallel shafts and arranged in a housing into which hot drying air is fed.

U.S. Pat. No. 3,370,938 discloses a method and apparatus particularly for roasting finely divided particles of metal sulfide ores. Agglomerated bed particles are fluidized in a second fluid bed, which is positioned below and opens into the bed plate of a first main fluid bed. The agglomerated, relatively coarse bed particles are currently removed from the second fluid bed, while relatively fine bed particles are removed from the first fluid bed suspended in the fluidizing gas discharged therefrom. The fine particles may be returned to the fluidized bed system.

DE 2929056 A1 discloses a fluid bed used in a quite different field, namely in a combustion chamber. This fluid bed is formed by inert, non-combustible fluidizable particles above a perforated bed plate. Non-fluidizable particles of foreign matter which have inadvertently been introduced into the fluid bed are directed to discharge passages by the fluidizing air flows which are passed upwardly through the bed plate.

SUMMARY OF THE INVENTION

The present invention provides a method by means of which it is possible to dry or otherwise heat treat a moist, particulate product, the particles of which tend to form lumps, in a fluid bed without using feeding means comprising a delumper.

Thus, the present invention provides a method of heat treating a particulate product including fluidizable as well as non-fluidizable particles of the product, said method comprising feeding the particulate product to a first perforated bed plate forming a first stage of a fluid bed comprising at least one further stage defined by a second perforated bed plate, supplying heat treating gas upwardly through said first and second bed plates so as to fluidize the fluidizable product particles thereon, directing non-fluidizable particles from said first bed plate into at least one discharge passage opening in the first bed plate and extending downwardly therefrom, directing a flow of classifying gas upwardly through the discharge passage so as to fluidizable particles from leaving the fluid bed through the discharge passage, while non-fluidizable particles are allowed to be discharged therethrough, and transferring fluidizable product particles from the first stage into the said further second stage of the fluid bed for further treatment. The non-fluidizable particles of lumps may be directed towards such a passage by directing the flows or fluidizing drying gas towards the passage. Additionally, the first bed plate on which the fluidized layer is formed may slope downwardly towards said passage. The separated non-fluidizable particles or lumps may be used for any purpose. For example, the lumps or particles may be dissolved and spray dried so as to form a moist, particulate product which may be further treated. Alternatively, all or part of the non-fluidizable particles removed from the first bed plate may be returned thereto in a disintegrated condition. Because the non-fluidizable particles are separated in the fluid bed they will become exposed to the fluidizing heat treating gas, whereby they are dried to some extent. Therefore, when non-fluidizable particles are removed from the bed plate, they may in most cases rather easily be disintegrated to such an extent that they may be recycled to the first or said further fluid bed. Some of the non-fluidizable particles may be recycled more than once, before they are disintegrated sufficiently to become fluidizable. If necessary, the non-fluidizable particles may be further dried and/or disintegrated in a suitable drying and/or disintegrating device before they are recycled.

The heat treatment to which the particulate product is exposed, is preferably a drying and/or cooling process. Consequently, the gas used for fluidizing the fluidizable particles in the fluid bed is preferably a gas with a temperature, which may be higher or lower than the temperature of the particulate product being treated. If the primary purpose of the heat treatment is to cool the particulate product fed into the fluid bed, the fluidizing gas should, of course, have a temperature which is substantially lower than the temperature of the particulate product fed into the first stage of bed.

A bed plate having a downwardly extending passage or duct and having means for providing an upwardly directed particle classifying gas flow therethrough for discharging non-fluidizable particles from the fluid bed is known per se, for example from DD PS 264 278, EP-PS 87039 and GB patent application No. 2,126,916.

The gas directed upwardly through the passage for classifying the particles removed therethrough may be the same as that supplied to the fluid bed for fluidizing the fluidizable particles. However, in cases where the product being treated is of a thermoplastic nature so that the product particles become sticky and tend to form lumps when heated, the temperature of the classifying gas is preferably lower than the temperature of the fluidizing gas, whereby the non-fluidizable particles are cooled when they are removed from the fluid bed.

The fluid bed has at least two stages and may be a multistage fluid bed. The first stage of the fluid bed to which the particulate product is fed may be of the type with plug flow. In the preferred embodiment, however, this first stage is a back mixed fluid bed, and the particulate product is then preferably spread over a substantial area of the first bed plate when supplied thereto. Such spreading of the product may be obtained by means of mechanical spreading means, for example by feeding a stream of the possibly also moist and/or sticky particulate product to a spreading member, which may be rotatable about a substantially horizontal or vertical axis.

As mentioned above, the first stage to which the particulate material is fed may be a back mixed fluid bed in which the separation and removal of the non-fluidizable particles takes place, and the fluidized particulate material may then be transferred from the back mixed fluid bed into a plug flow fluid bed forming a second stage, in which the product is exposed to a further heat treatment or drying treatment.

The separated non-fluidizable particles may be discharged currently through said passage. However, the non-fluidizable particles are preferably discharged from the passage intermittently, namely when a suitable amount of non-fluidizable particles have been collected in the passage, whereby the time period in which the non-fluidizable particles are exposed to the classifying gas, which may be a drying gas, is increased.

The discharge of non-fluidizable particles from the passage may take place at predetermined time intervals. When a layer of non-fluidizable particles has been collected on the first bed plate adjacent to the discharge passage, the temperature immediately above the first bed plate will be substantially the same as the temperature below this bed plate, because no substantial evaporation takes place in the layer of non-fluidizable particles. Therefore, the discharge of non-fluidizable particles from the passage may at least partly be controlled in response to a difference in temperatures measured adjacent to said passage below and immediately above the first bed plate of the fluid bed, respectively.

As an example the product to be dried may be a detergent which has been dried by a spray drying process to a high residual moisture content. Due to the relatively high amount of residual moisture, the particles of the particulate product will tend to form lumps so that part of the product fed into the first stage of the fluid bed will be non-fluidizable particles or lumps which are removed from the fluid bed and may be recycled. The first stage of the fluid bed to which the moist product is fed may be of the back-mixed type, and the fluidizable particles may be passed into a further stage of the fluid bed with plug flow, in which the particles are further dried to their final residual moisture content.

The present invention also provides an apparatus for heat treating a moist, particulate product including fluidizable as well as non-fluidizable particles of the product, said apparatus comprising a perforated first bed plate having at least one downwardly extending duct formed therein, at least one further perforated bed plate, first means for supplying fluidizing heat treating gas upwardly through the perforations of the bed plates so as to fluidize the fluidizable particles thereon, second means for supplying a flow of classifying gas upwardly through said duct, means for supplying product to be treated onto the first bed plate, means for transferring fluidized particles from the first onto said further first bed plate, and means for moving non-fluidizable particles fed to the first bed plate into the duct. The apparatus may comprise means for returning non-fluidizable particles from said duct to one of the bed plates in a disintegrated condition. The duct from which the non-fluidizable particles are discharged may be connected to a disintegrating device, such as a mixing device in which the particles are disintegrated to such an extent, that at least part thereof is made fluidizable. If the product to be treated is of a thermoplastic nature, the particles are preferably cooled and made non-sticky, before they are treated by the disintegrating means or disintegrating device.

The upper end of the duct may open into a sink for collecting non-fluidizable particles from the first bed plate so as to obtain a pre-separation of the non-fluidizable particles from the fluidizable particles prior to the final separation obtained by the upward flow of classifying gas. In order to promote movement of the non-fluidizable particles toward the sink and the duct opening therein, bed plate sections adjacent to the sink may define perforations therein for directing flows of fluidizing gas toward the sink. The bottom of the sink may be formed by perforated directional bed plates, which slope downwardly towards the duct to further promote movement of the non-fluidizable particles into the duct.

The first bed plate to which the product to be treated is fed, is preferably of a type and shape forming a back mixed fluid bed thereon, and the back mixed fluid bed may communicate with a plug flow stage of the fluid bed via an overflow such as weir or a duct. The bed plates or bed plate sections may be stationary. Alternatively, a vibrator may be provided for vibrating at least part of one of the bed plates or of one or more bed plate sections.

The means for returning non-fluidizable particles may comprise discharge means for intermittently discharging non-fluidizable particles from the duct and control means for controlling the operation of the discharge means. These discharge means may, for example, include one or more dampers, and the control means may be adapted to open such damper or dampers at regular time intervals. In the preferred embodiment, however, the operation of the control means may also be influenced by temperature sensing means positioned adjacent to said duct below and immediately above the first bed plate, respectively, for transmitting temperature signals to said control means, whereby a layer of non-fluidizable particles on the first bed plate adjacent to the duct may be detected as explained above.

The product supply means may comprise means for spreading the product over a substantial part of the first bed plate, and these spreading means may comprise a rotor with a substantially horizontal or vertical axis.

The driving means or motor for driving the rotor may be controlled so as to adapt the rotational speed of the rotor to the specific product being treated. Furthermore, when the operation of the apparatus is started, the speed of the rotor may be adapted to the starting operational conditions of the apparatus. The particulate product may be supplied to the spreading means or spreading rotor in any convenient manner. Preferably, the product is supplied by means of a conveyor belt having a discharge end located above the rotor for supplying a continuous flow of the moist particulate product to the rotor.

The width of the conveyor belt and the axial length of the spreading rotor may be adapted to the amount of particulate product currently supplied, so that a suitable continuous stream of product is fed to each unit of length of the rotor.

BRIEF DESCRIPTION OF THE DRAWINGS

The invention will now be further described with reference to the drawing, wherein FIG. 1 diagrammatically illustrates a fluid bed dryer according to the invention in an isometric view, certain wall parts having been cut away, FIG. 3 is a top plan view of one end of the fluid bed dryer shown in FIG. 2, FIG. 4 is a sectional view showing a discharge duct for discharging non-fluidizable particles from the dryer, in an enlarged scale, and FIG. 5 is a cross-sectional view of the discharge duct along the line V—V in FIG. 4.

DESCRIPTION OF THE PREFERRED EMBODIMENTS

Figure 1:
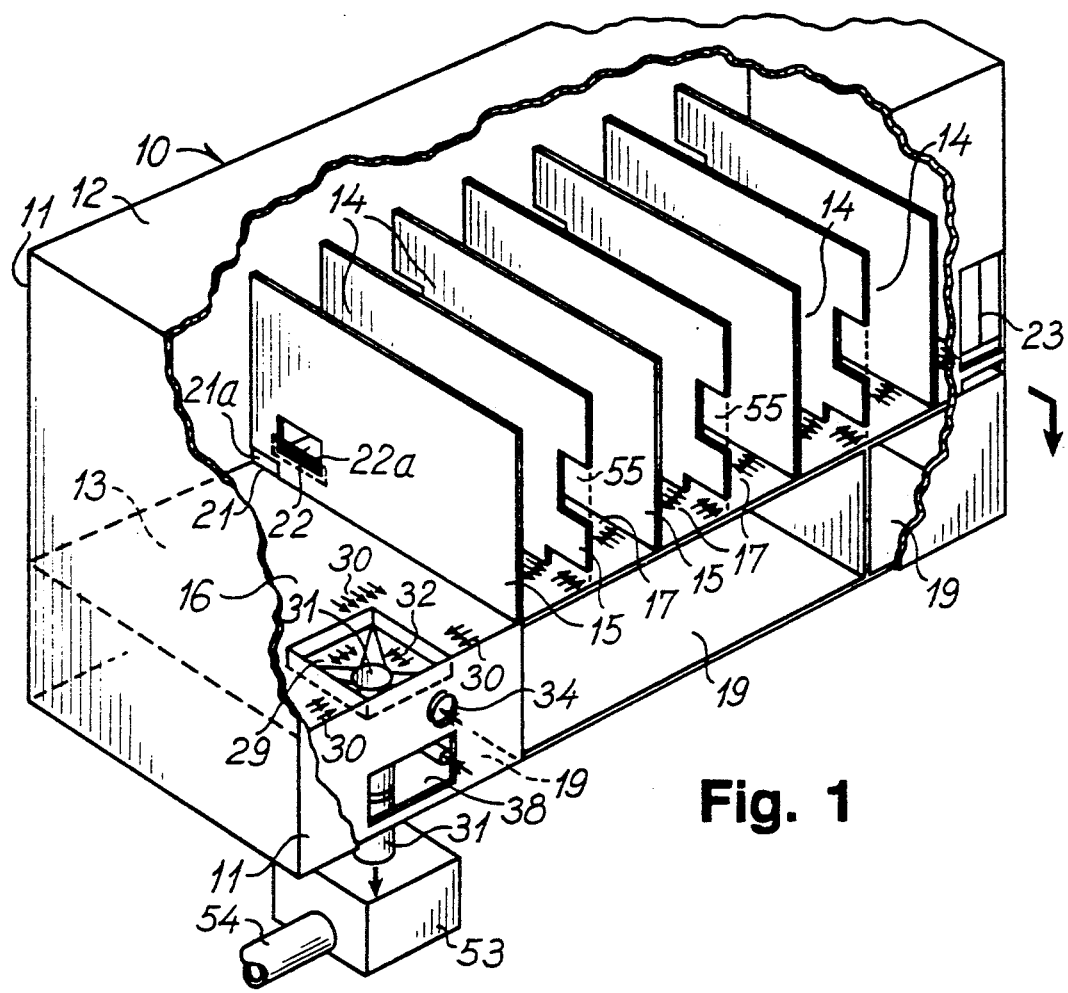
Figure 2:
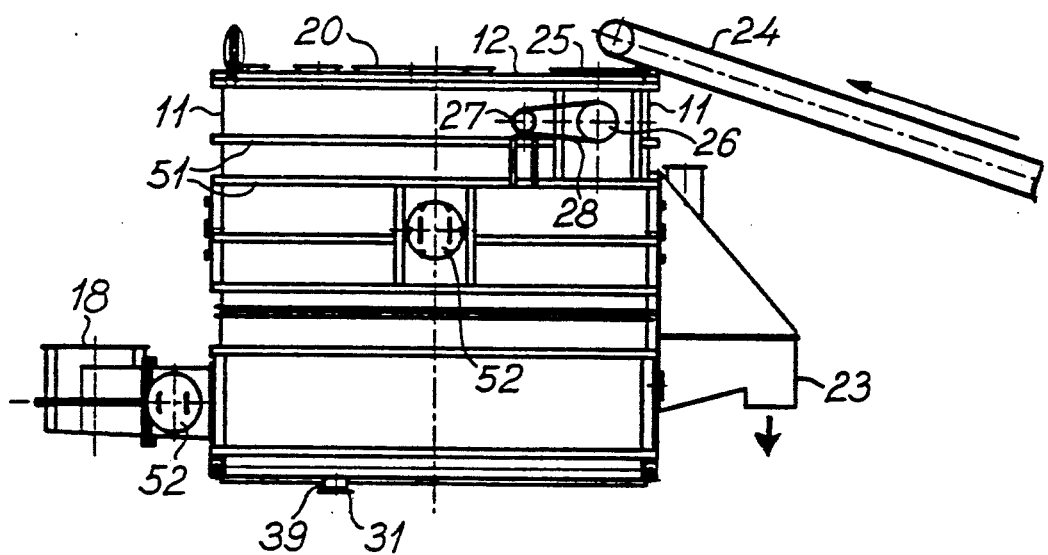
FIG. 2 is an end view of the fluid bed dryer.

The fluid bed dryer illustrated in FIGS. 1-3 is a multistage dryer comprising an elongated housing 10 having a pair of opposite side walls 11 and a top wall 12. The housing is divided into a compartment 13 and a plurality of compartments 14 by means of a number of transversely extending, substantial parallel partition walls 15. The floor or bottom wall of the compartment 13 is formed by a perforated bed plate 16, and the floors or bottom walls of the narrower compartments 14 are formed by perforated bed plates 17. Fluidizing drying gas or air may be supplied through gas inlet conduits 18 into plenum chambers 19, which are defined in the housing 10 below the bed plates 16 and 17, whereby flows of fluidizing gas or air are directed upwardly through the perforations of the bed plates 16 and 17, and the gas or air is discharged through a gas discharge opening 20 formed in the top wall 12 of the housing 10, vide FIGS. 2 and 3. A particulate product to be dried may be supplied to the compartment 13 through the top wall 12 as described more in detail below. This product will then be fluidized by the upwardly directed flows of fluidizing gas, and the bed plate 16 in the compartment 13 is of a type forming a back mixed fluid bed. An overflow opening 22, which may be partly closed by a vertically adjustable slide gate 22a, is defined in the partition wall 15 adjacent to the compartment 13, and each of the bed plates 17 is of a type which may form a fluid bed of the plug flow type thereon. Thus, the particulate product, which is fed into the compartment 13 forms a fluid bed of the back mixed type, and partly dried product flows continuously from the back mixed bed through the opening 22 in the first partition wall 15 into the adjacent plug flow compartment 14, and the particulate product to be dried will continue through the various compartments 14 which are connected in series through underflow openings 21 defined in the partition walls 15. The underflow opening 21 in the first partition wall 15 separating the compartment 13 from the plug flow compartments 14 is closed under operation by means of a slide gate 21a which is opened only, when product is to be emptied from the dryer. The product which has been dried to the desired residual moisture content is continuously discharged through a product outlet 23. The partition walls 15 may also have a cut-out or opening 55 to allow a person to pass from one of the compartments 14 to another for inspection or repair.

As far as described up till now, the fluid bed dryer is well-known and a similar fluid bed dryer design involving a back mixed section followed by a plug flow section is disclosed for example in U.S. Pat. No. 4,492,040. However, the fluid bed dryer shown in the drawings is adapted to dry a product which contains not only fluidizable particles, but also non-fluidizable particles, for example because the product has a relatively high residual moisture and/or because the product is of a thermoplastic type and has been produced by a spray drying process. The particulate product to be dried is continuously supplied to the fluid bed dryer by means of a conveyor belt 24. The product is moved to a position immediately above the top wall 12 of the housing, and falls downwardly through a product inlet opening 25 defined in the top wall 12. The falling product hits a spreading rotor 26 positioned within the compartment 13 immediately below the product inlet opening 25. The rotor 26 is driven by an electric motor 27 through a belt or chain 28 or a similar force transmitting device. The rotating spreading rotor 26 spreads the product supplied by the conveyor belt 24 substantially uniformly over a substantial area of the bed plate 16 in the compartment 13, whereby the fluidizable particles of the product become fluidized so as to form a back mixed fluid bed. The fluidized particles may then move from the back mixed fluid bed in the compartment 13 into the plug flow compartments 14 as described above.

The non-fluidizable particles of the product, however, will form a non-fluidized layer of particles on the upper surface of the bed plate 16, and means are provided for removing the non-fluidizable particles from the bed plate 12. These means comprise a sink 29 formed in the bed plate 16 adjacent to one of the side walls 11 and remote from the opening 22 in the adjacent partition wall 15. The openings or perforations of the bed plate sections adjacent to the sink 29 are shaped so as to direct flows of fluidizing air or gas towards the sink 29 as indicated by arrows 30 in FIG. 1. A discharge duct 31 for non-fluidizable particles opens into the sink. The bottom of the sink is also provided with perforations shaped so as to direct gas or air flowing upwardly therethrough towards the discharge duct 31 as indicated by arrows 32 in FIG. 1. This means, that the non-fluidizable particles collected on the upper surface of the bed plate 16 will be moved into the sink 29 and then down into the discharge duct 31.

FIGS. 4 and 5 illustrate the discharge duct 31 more in detail. As shown in FIG. 4, the duct 31 opens into the sink 29, which is funnel-shaped. Drying air or gas supplied through a gas inlet 34 to a plenum chamber 35 located below the sink may flow upwardly through the perforations in the sink so as to direct the non-fluidizable particles towards the duct 31. The fluidizing air or gas supplied to the plenum chamber 35 may have a pressure and/or temperature corresponding to or differing from the pressure and/or temperature of the fluidizing air or gas supplied to the plenum chambers 19 located below the bed plates 16 and 17. Preferably, the fluidizing air or gas supplied to the plenum chamber 35 has a pressure exceeding the pressure of the air or gas supplied to the plenum chamber located below the bed plate 16, whereby fluidizable particles moving into the sink 29 may be separated from the non-fluidizable particles therein. In the plenum chamber 35 the discharge duct 31 has a double wall so as to define a thermal insulating annular air space 36 between such walls. The annular air space 36 communicates with a chamber 37 defined in the housing 10 below the plenum chamber 35, and this chamber 37 communicates with the ambient atmosphere through an opening 38 in the adjacent housing side wall 11. The discharge duct 31 comprises a pair of axially spaced duct sections 39 each containing a damper 40 movable between open and closed positions by means of suitable driving means, not shown. These driving means may be controlled by a control device 41 so that the dampers 40 are opened and closed at predetermined time intervals. The movement of the dampers may alternatively or additionally be controlled on the basis of temperature signals received by the control device 41 from temperature sensors 42 which may be arranged in the plenum chamber 19 below the bed plate 16 and immediately above this bed plate, respectively, and adjacent to the sink 29. When the difference in the temperatures measured by the sensors 42 has reached a certain predetermined minimum value this may indicate that the layer of non-fluidized particles on the bed plate has reached a certain maximum thickness as previously explained. Therefore, such minimum value of the temperature difference indicates that the dampers 40 should be opened so that the non-fluidizable particles collected in the duct 31 could be discharged.

In order to ensure that the fluidizable particles in the compartment 13 are not discharged through the duct 31 together with the non-fluidizable particles, a classifying gas or air flow is directed upwardly through the duct 31. The classifying gas or air is supplied to an annular or ring shaped tube 43 surrounding the duct 31 through a gas supply tube 44 extending through the gas inlet 38. The annular or ring-shaped tube 43 communicates with the duct 31 through a radially directed passage 45 and through a pair of substantially parallel passages 46, which are directed tangentially to the duct 31 and opposite to the radial passage 45. The passages 45 and 46 may be downwardly directed so as to define a small acute angle of about 10° with a radial plane perpendicular to the longitudinal axis of the duct 31.

The non-fluidizable particles discharged through the duct 31 may be supplied to a suitable disintegrating device 53, such as a so-called Zigzag Mixer marketed by PK-Niro Atomizer A/S, Denmark. The disintegrated particles may then be recycled to the fluid bed in the compartment 13 through a return conduit 54.

The walls of the housing 10 may be provided with stiffening ledges or ribs 51 for rigidfying the structure and with man hole covers 52 for facilitating access to the inner of the housing 10.

It should be understood that various amendments and modifications of the structure described above could be made without departing from the scope of the present invention. Thus, for example, the spreading rotor could be replaced by any other type of spreading device, such as a centrifugal spreading rotor having a substantially vertical axis. Furthermore, the disintegrating device may in some cases be dispensed with, because the non-fluidizable particles are to some extent disintegrated by the mere recycling and drying, or part of the separated non-fluidizable particles may be withdrawn from the duct 31 and used for other purposes. The separated non-fluidizable particles or lumps may be disintegrated and introduced into the feed of an upstream spray dryer.

I claim:

1. A method of heat treating a particulate product including fluidizable as well as non-fluidizable particles of the product, said method comprising
   feeding the particulate product to a first perforated bed plate, forming a first stage of a fluid bed comprising at least one further stage defined by a second perforated bed plate,
   supplying heat treating gas upwardly through said first and second bed plates so as to fluidize the fluidizable product particles thereon,
   directing non-fluidizable particles from said first bed plate into at least one discharge passage opening in the first bed plate and extending downwardly therefrom,
   directing a flow of classifying gas upwardly through the discharge passage so as to prevent fluidizable particles from leaving the fluid bed through the discharge passage, while non-fluidizable particles are allowed to be discharged therethrough, and
   transferring fluidizable product particles from the first stage into the said further second stage of the fluid bed for further treatment.

2. A method according to claim 1, wherein at least part of the non-fluidizable particles removed from the first bed plate is returned to one of said bed plates in a disintegrated condition.

3. A method according to claim 1, wherein the heat treating gas is a drying gas.

4. A method according to claim 3, wherein the particulate product is fed to the first bed plate in a predried condition.

5. A method according to claim 4, wherein the product is predried in a spray drying process.

6. A method according to claim 1, wherein the heat treating gas is a cooling gas.

7. A method according to claim 1, wherein the heat treating, fluidizing gas is the same as that used as classifying gas.

8. A method according to claim 1, wherein the temperature of the classifying gas is lower than the temperature of the fluidizing gas.

9. A method according to claim 1, wherein the first stage of the fluid bed is a back mixed fluid bed.

10. A method according to claim 1, wherein the particulate product supplied to the first bed plate is spread over a substantial area thereof.

11. A method according to claim 10, wherein a stream of the particulate product is fed to a rotating spreading member.

12. A method according to claim 9, wherein said second stage of the fluid bed is a plug flow fluid bed.

13. A method according to claim 1, wherein the separated non-fluidizable particles are discharged from the discharge passage intermittently.

14. A method according to claim 13, wherein the discharge of non-fluidizable particles through the discharge passage is at least partly controlled in response to a difference in temperatures measured adjacent to said passage below and immediately above the first bed plate, respectively.

15. A method according to any of the claims 1-14, wherein the product is a detergent powder.

16. An apparatus for heat treating a moist, particulate product including fluidizable as well as non-fluidizable particles of the product, said apparatus comprising a perforated first bed plate having at least one downwardly extending discharge duct formed therein, at least one further perforated bed plate, first means for supplying fluidizing heat treating gas upwardly through the perforations of the bed plates so as to fluidize the fluidizable particles thereon, second means for supplying a flow of classifying gas upwardly through said discharge duct, means for supplying product to be treated onto the first bed plate, means for transferring fluidized particles from the first bed plate onto said further bed plate, and means for transferring moving non-fluidizable particles fed to the first bed plate into the discharge duct.

17. An apparatus according to claim 16, further comprising means for returning non-fluidizable particles from said discharge duct to one of said bed plates in a disintegrated condition.

18. An apparatus according to claim 16, wherein said first gas supply means are drying gas supply means.

19. An apparatus according to claim 16, wherein said first gas supply means are cooling gas supply means.

20. An apparatus according to claim 16, wherein the first bed plate is of a type and shape forming a back mixed fluid bed thereon.

21. An apparatus according to claim 17, wherein said means for returning non-fluidizable particles comprise particle disintegrating means.

22. An apparatus according to claim 16, wherein the upper end of said duct opens into a sink for collecting non-fluidizable particles from the first bed plate.

23. An apparatus according to claim 22, wherein bed plate sections adjacent to the sink define perforations therein for directing flows of fluidizing gas toward the sink.

24. An apparatus according to claim 23, wherein the sink is defined by plate sections having perforations therein for directing flows of fluidizing gas toward said discharge duct.

25. An apparatus according to claim 20, wherein said further bed plate comprised a plug flow bed plate.

26. An apparatus according to claim 25, wherein the back mixed fluid bed formed by the first bed plate communicates with the plug flow fluid bed formed by said further bed plate via an overflow.

27. An apparatus according to claim 26, wherein the overflow is a weir or duct.

28. An apparatus according to claim 16, further comprising a vibrator for vibrating at least part of the bed plates.

29. An apparatus according to claim 16, further comprising means for intermittently discharging non-fluidizable particles from the discharge duct and control means for controlling the operation of the discharge means.

30. An apparatus according to claim 29, further comprising temperature sensing means positioned adjacent to said discharge duct below and immediately above the first bed plate, respectively, for transmitting temperature signals to said control means.

31. An apparatus according to any of the claims 16–29, wherein the product supply means comprise means for spreading the product over a substantial part of the first bed plate.

* * * * *

UNITED STATES PATENT AND TRADEMARK OFFICE
CERTIFICATE OF CORRECTION

PATENT NO. : 5,133,137

DATED : July 28, 1992

INVENTOR(S) : BJARNE MANTHEY PETERSEN

It is certified that error appears in the above-identified patent and that said Letters Patent is hereby corrected as shown below:

Column 2, line 17, after "to" insert --prevent--.

Signed and Sealed this

Nineteenth Day of October, 1993

Attest:

BRUCE LEHMAN

*Attesting Officer*    *Commissioner of Patents and Trademarks*